United States Patent
Stoler et al.

(10) Patent No.: US 7,149,227 B2
(45) Date of Patent: Dec. 12, 2006

(54) ROUND-ROBIN ARBITER WITH LOW JITTER

(75) Inventors: Gil Stoler, Nofit (IL); Diego Crupnicoff, Buenos Aires (AR)

(73) Assignee: Mellanox Technologies Ltd., Yokneam (IL)

( * ) Notice: Subject to any disclaimer, the term of this patent is extended or adjusted under 35 U.S.C. 154(b) by 1042 days.

(21) Appl. No.: 10/158,476

(22) Filed: May 31, 2002

(65) Prior Publication Data

US 2003/0223453 A1 Dec. 4, 2003

(51) Int. Cl.
*H04B 7/212* (2006.01)
*H04J 3/02* (2006.01)

(52) U.S. Cl. .................... 370/442; 370/462
(58) Field of Classification Search .......... None
See application file for complete search history.

(56) References Cited

U.S. PATENT DOCUMENTS

| | | | |
|---|---|---|---|
| 5,506,969 A | 4/1996 | Wall et al. | |
| 5,689,508 A | 11/1997 | Lyles | |
| 5,864,540 A | 1/1999 | Bonomi et al. | |
| 5,926,459 A | 7/1999 | Lyles et al. | |
| 5,983,278 A | 11/1999 | Chong et al. | |
| 6,011,775 A | 1/2000 | Bonomi et al. | |
| 6,064,650 A | 5/2000 | Kappler et al. | |
| 6,667,984 B1 * | 12/2003 | Chao et al. | 370/414 |
| 7,006,501 B1 * | 2/2006 | Gura et al. | 370/395.42 |
| 2004/0223466 A1 * | 11/2004 | Schrader et al. | 370/321 |

OTHER PUBLICATIONS

U.S. Appl. No. 10/052,435, filed Jan. 23, 2002, entitled "Handling Multiple Network Transport Service Levels with Hardware and Software Arbitration".
U.S. Appl. No. 10/000,456, filed Dec. 4, 2001, entitled "Network Interface Adapter with Shared Data Send Resources".
The InfiniBand Architecture specification, Release 1.0, Oct. 2000 (Available at www.inifinibandta.org).

* cited by examiner

*Primary Examiner*—Duc Ho
(74) *Attorney, Agent, or Firm*—Mark M. Friedman

(57) ABSTRACT

A method for allocating a processing resource among multiple inputs includes defining a sequence of multiplexing iterations, each such iteration including a first plurality of windows, each such window containing a second plurality of time slots. A respective weight is assigned to each of the inputs, and each of the inputs is allotted one of the time slots in each of a respective number of the windows in each of the iterations, the respective number being determined by the respective weight. Each of the inputs is then provided with access to the processing resource during the time slots allotted thereto.

37 Claims, 6 Drawing Sheets

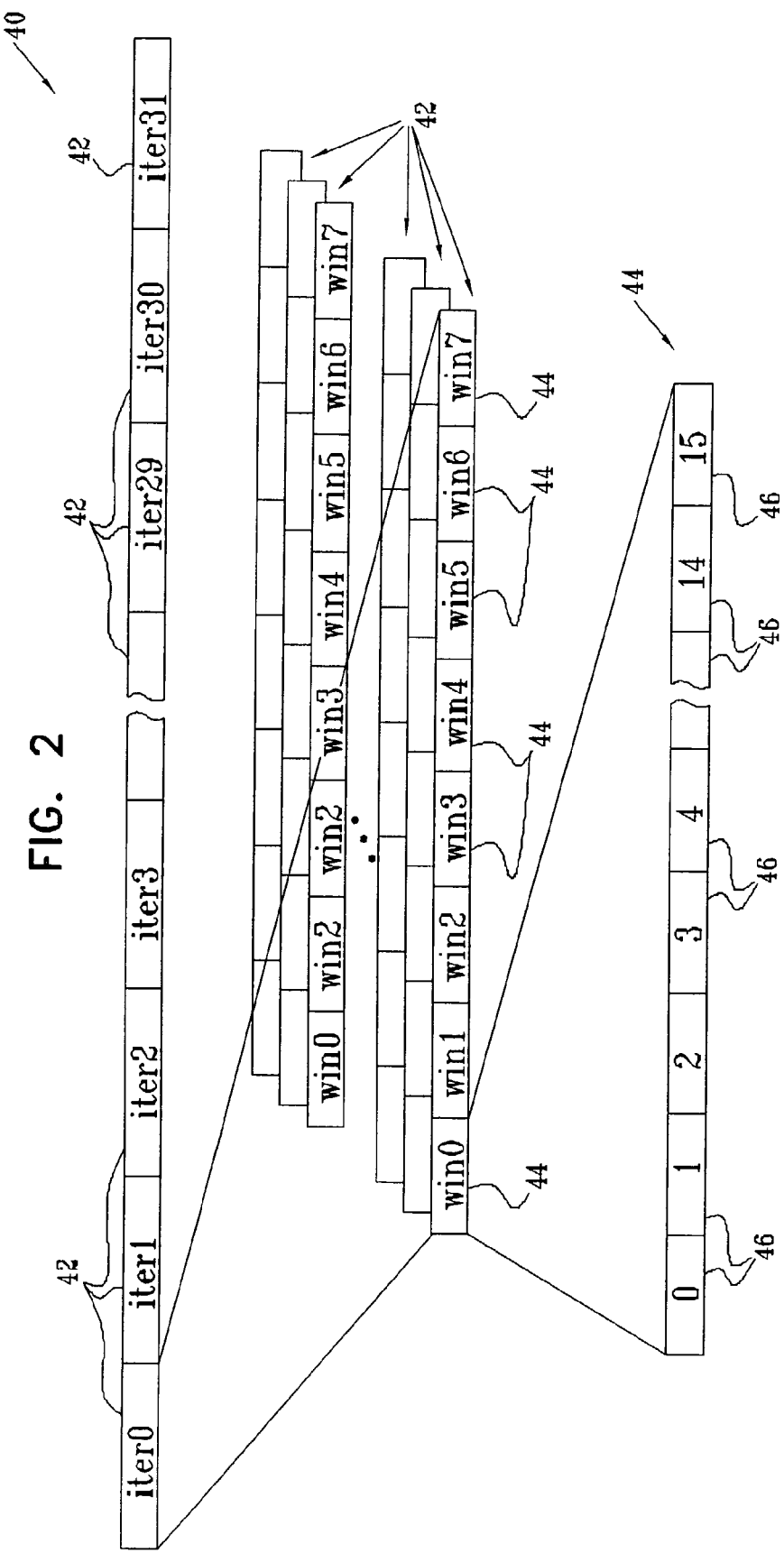

ROUND-ROBIN ARBITER WITH LOW JITTER

FIELD OF THE INVENTION

The present invention relates generally to digital data processing circuits, and specifically to arbitration circuits for allocating use of processing resources.

BACKGROUND OF THE INVENTION

Problems of fair arbitration are common in modern electronic devices and systems. These problems arise when there is competition among multiple inputs for access to some limited processing resource. Frequently, the inputs have different priority levels, as well as different weights, corresponding to the relative shares of the resource that they are entitled to receive. The priorities and weights may typically change dynamically in the course of operation of the circuit. Under these circumstances, it is necessary to implement a design that will ensure that the inputs are serviced in order of priority, and that each input receives its fair share of the resource in proportion to its assigned weight.

For example, arbitration schemes are commonly used in controlling access to a communication bus. A scheme of this sort is described in U.S. Pat. No. 5,506,969, whose disclosure is incorporated herein by reference. A plurality of client applications operating on a computer system request services from a high-speed bus to transfer data from a source module to a destination module. A bus manager schedules transfer orders for the transfer requests based on a bus management policy. The bus manager implements a time-driven resource management policy, which aims to schedule all outstanding bus transfers in a shortest-deadline-first order, so that the transfers are executed in order of urgency.

Arbitration schemes are also used for routing packets and shaping traffic flow in packet-switched communication networks. For example, U.S. Pat. No. 5,689,508, whose disclosure is incorporated herein by reference, describes a reservation ring mechanism used for resolving conflicts among packet switch inputs contending for access to the same outputs. The reservation ring performs a sequence of step-and-compare operations in a top-to-bottom ring-like order during each arbitration cycle. The mechanism is consistent with the order required by self-clocked weighted fair queuing, with up to a maximum permissible number of contenders receiving access to any given output on each arbitration cycle.

U.S. Pat. Nos. 5,864,540 and 6,011,775, whose disclosures are incorporated herein by reference, describe a scalable integrated traffic shaper for use in a packet-switched network, and specifically for switching cells in an Asynchronous Transfer Mode (ATM) network. The shaper regulates multiple connections and prevents lost data by integrating link scheduling and traffic shaping to fairly arbitrate between incoming connections. It attempts to shape traffic at the edges of the network while equitably distributing bandwidth, even during periods of bursty traffic. For this purpose, cells coming into a switch are placed in per-connection queues. The cells are taken from the queues for processing based on round-robin scheduling. The scheduling is weighted in favor of high-bandwidth connections, so that each connection receives a quantity of cells that is proportionate to its bandwidth. For high-bandwidth queues, instead of taking one cell at a time, several cells from the input queue are processed simultaneously. The inventors note that the techniques they describe can also be used to schedule links in a network interior, so as to reduce packet delay jitter and downstream buffering requirements.

Other exemplary methods of fair arbitration and flow control in packet-switched networks are described in U.S. Pat. Nos. 5,926,459, 5,983,278 and 6,064,650, whose disclosures are likewise incorporated herein by reference.

SUMMARY OF THE INVENTION

It is an object of some aspects of the present invention to provide an improved round-robin arbiter, which arbitrates fairly among multiple inputs with different priorities and weights.

It is a further object of some aspects of the present invention to provide a round-robin arbiter that allocates a processing resource smoothly among those of its inputs requesting service, even in the absence of advance knowledge or predictability regarding the demand for the resource among the inputs. In other words, the available bandwidth of the resource should be distributed roughly evenly among these inputs, in proportion to their weights, and each input should be serviced at a relatively steady rate. In communication applications, for example, in which each input is typically directed to a particular output of the processing resource (such as a particular switch port or communication link), this smooth allocation means that data are sent to each output at a steady rate, as well. Thus, the output bandwidth jitter of the resource is minimized, and the likelihood of downstream data pile-up and congestion is reduced.

It is yet a further object of some aspects of the present invention to provide a round-robin arbiter that behaves stably and maintains fairness in the face of bursts of data at its inputs.

It is still a further object of some aspects of the present invention to provide a round-robin arbiter that meets the preceding objects, while maintaining simplicity of design, so that the arbiter can be economically embedded in communication processing chips and other integrated circuits.

These objects are addressed by preferred embodiments of the present invention, in which a processor receives multiple inputs, having different, user-configurable priorities and weights. An arbiter selects the inputs to be serviced by the processor by defining a sequence of multiplexing iterations, each divided into a plurality of windows, with each window subdivided into time slots. The number of time slots in each window is variable, preferably up to a maximum equal to the number of inputs. Each input may thus receive up to one time slot in each of the windows in any given iteration. The arbiter allows each input to pass data to the processor during the time slots allocated to that input, if requested by the input.

The number of windows in which the input actually receives a time slot is proportional to the weight and priority of the input. The arbiter preferably distributes the time slots so that all the windows in a given iteration are approximately equally filled, and so that the windows during which any given input is serviced are approximately evenly spaced over the iteration. As a result, the arbiter both maintains fairness in servicing the inputs and ensures that there will be low jitter in the processor outputs.

In some preferred embodiments of the present invention, in order to deal with bursts of input data and allow greater granularity in assigning weights to the different inputs, the arbiter allocates a processing quota to each input that is proportional to its weight. The arbiter tracks the use of the quotas by the inputs over a cycle of multiple iterations. When an input has exhausted its quota for a given cycle, it is then blocked for the remainder of the cycle. Additionally or alternatively, if an input submits a burst of data in excess of its fair share (such as a data packet that is larger than normal) for processing at one of its assigned time slots, the arbiter may subsequently block that input from submitting further data. This blocking may apply to subsequent windows in the same iteration, or to subsequent iterations in the cycle, so that fairness among the inputs is restored. This system of quotas and blocking thus supports a range of input weights with granularity equal to the number of windows in each iteration times the number of iterations in a cycle. Preferably, the arbiter also has mechanisms for detecting deadlocks (in which all the inputs are blocked), as well as "livelocks" (in which low-priority inputs are blocked for excessively long periods due to high-priority activity), and for recovery from these situations when they occur.

In one preferred embodiment of the present invention, the arbiter and processor are part of a network adapter, which receives work requests from a host computer to transmit data packets over a network, and generates the packets accordingly. The multiple inputs to the arbiter correspond to different network connections or transport service instances that are in use by different processes on the host. In other embodiments of the present invention, the processor may be a part of some other network communication element, such as a switch, or of substantially any other multi-input arbitrated processing device.

There is therefore provided, in accordance with a preferred embodiment of the present invention, a method for allocating a processing resource among multiple inputs, including:

defining a sequence of multiplexing iterations, each such iteration including a first plurality of windows, each such window containing a second plurality of time slots;

assigning a respective weight to each of the inputs;

allotting to each of the inputs one of the time slots in each of a respective number of the windows in each of the iterations, the respective number being determined by the respective weight; and providing each of the inputs with access to the processing resource during the time slots allotted thereto.

Preferably, defining the sequence of multiplexing intervals includes defining a round-robin cycle including a third plurality of the multiplexing intervals, and providing each of the inputs with access includes allocating to each of the inputs a quota of use of the resource responsive to the respective weight, and permitting the access by a given one of the inputs only if that one of the inputs has not reached its quota during the cycle. Further preferably, allocating the quota includes reallocating the quota upon completion of the cycle, so as to provide each of the inputs with the access during a subsequent cycle responsive to the reallocated quota. Additionally or alternatively, defining the cycle includes defining respective starting points of the cycle for the multiple inputs, such that the starting points for at least two of the inputs are not mutually simultaneous. In a preferred embodiment, the resource is operative to convey data submitted by the inputs, and allocating the quota includes allocating a quantity of the data to be conveyed during the cycle using the resource.

In a further preferred embodiment, the method includes assigning each of the inputs to one of at least a high and a low priority level, wherein defining the sequence of multiplexing intervals includes defining a first sequence of the multiplexing intervals for the inputs assigned to the high priority level, and a second sequence of the multiplexing intervals for the inputs assigned to the low priority level.

Preferably, providing the access includes preventing the inputs at the low priority level from accessing the resource when at least one of the inputs at the high priority level has requested the access during one of the time slots. Most preferably, providing the access further includes computing a measure of use of the resource by the inputs at the high priority level, and permitting at least one of the inputs at the low priority level to access the resource when the measure has passed a predetermined limit without the access having been granted to any of the inputs at the low priority level.

Preferably, each of the time slots corresponds to a predetermined quantum of use of the resource, and providing the access includes determining when a given one of the inputs has exceeded the quantum in using the resource at one of its allotted time slots, and blocking the given one of the inputs from accessing the resource in a subsequent one of its allotted time slots, responsive to its having exceeded the quantum. In a preferred embodiment, the resource is operative to convey data submitted by the inputs, and wherein the predetermined quantum corresponds to a quantity of the data conveyed by the resource. Most preferably, determining when the given one of the inputs has exceeded the quantum includes determining an amount by which the given one of the inputs has exceeded the quantum, and blocking the given one of the inputs includes preventing the given one of the inputs from accessing the resource over multiple subsequent allotted time slots, responsive to the amount by which the quantum was exceeded.

Preferably, allotting the time slots includes interspersing the time slots allotted to each of the inputs, so that the slots allotted to each of the inputs are spread approximately evenly over time during the sequence of the iterations. Most preferably, interspersing the time slots includes, prior to allotting the time slots to one of the inputs, identifying one or more of the windows in which fewest of the time slots have already been allotted to others of the inputs, and allotting the time slots to the one of the inputs in the identified windows.

In a preferred embodiment, the processing resource includes multiple resource instances, wherein providing the access includes receiving a request from one of the inputs to access a specified one of the resource instances in a given one of the allotted time slots, and granting the request only if the specified one of the resource instances is available during the given one of the allotted time slots.

In a further preferred embodiment, the multiple inputs includes multiple execution engines, which are operative to prepare instructions regarding data to be transmitted over a network, and providing the access includes selecting one of the execution engines to submit the instructions, and transmitting a packet containing the data responsive to the instructions. Preferably, providing the access includes assigning each of the execution engines to a respective gather engine, which is operative to generate the packet responsive to the instructions, and transmitting the packet includes passing the instructions from the selected one of the execution engines to the respective gather engine, for generation of the packet thereby.

There is also provided, in accordance with a preferred embodiment of the present invention, apparatus for allocating a processing resource, including a round-robin arbiter which is configured to receive multiple inputs, each input having a respective weight assigned thereto, the arbiter being adapted to define a sequence of multiplexing iterations, each such iteration including a first plurality of windows, each such window containing a second plurality of time slots, and to allot to each of the inputs one of the time slots in each of a respective number of the windows in each of the iterations, the respective number being determined by the respective weight, the arbiter further being adapted to provide each of the inputs with access to the processing resource during the time slots allotted thereto.

There is additionally provided, in accordance with a preferred embodiment of the present invention, a network interface device, including:

an array of execution engines, which are coupled to receive work requests from a host processor to convey messages over a network, and which are adapted, responsive to the work requests, to prepare instructions regarding data packets to be transmitted over the network in order to convey the messages, each of the execution engines having a respective weight assigned thereto;

one or more gather engines, which are adapted to generate the data packets for transmission, responsive to the instructions; and an arbiter, which is adapted to define a sequence of multiplexing iterations, each such iteration including a first plurality of windows, each such window containing a second plurality of time slots, and to allot to each of the execution engines one of the time slots in each of a respective number of the windows in each of the iterations, the respective number being determined by the respective weight assigned to each of the execution engines, the arbiter being coupled between the array of execution engines and the one or more gather engines so as to allow each of the execution engines to pass its instructions to one of the gather engines during the time slots allotted thereto.

Preferably, each of the execution engines is coupled to receive the work requests belonging to a respective queue pair that is assigned thereto, and the respective weight is assigned to each of the execution engines responsive to a characteristic of the respective queue pair.

The present invention will be more fully understood from the following detailed description of the preferred embodiments thereof, taken together with the drawings in which:

BRIEF DESCRIPTION OF THE DRAWINGS

FIG. 2 is a timing diagram that schematically illustrates iterations, windows and time slots in a round-robin arbitration cycle, in accordance with a preferred embodiment of the present invention;

DETAILED DESCRIPTION OF PREFERRED EMBODIMENTS

Figure 1:
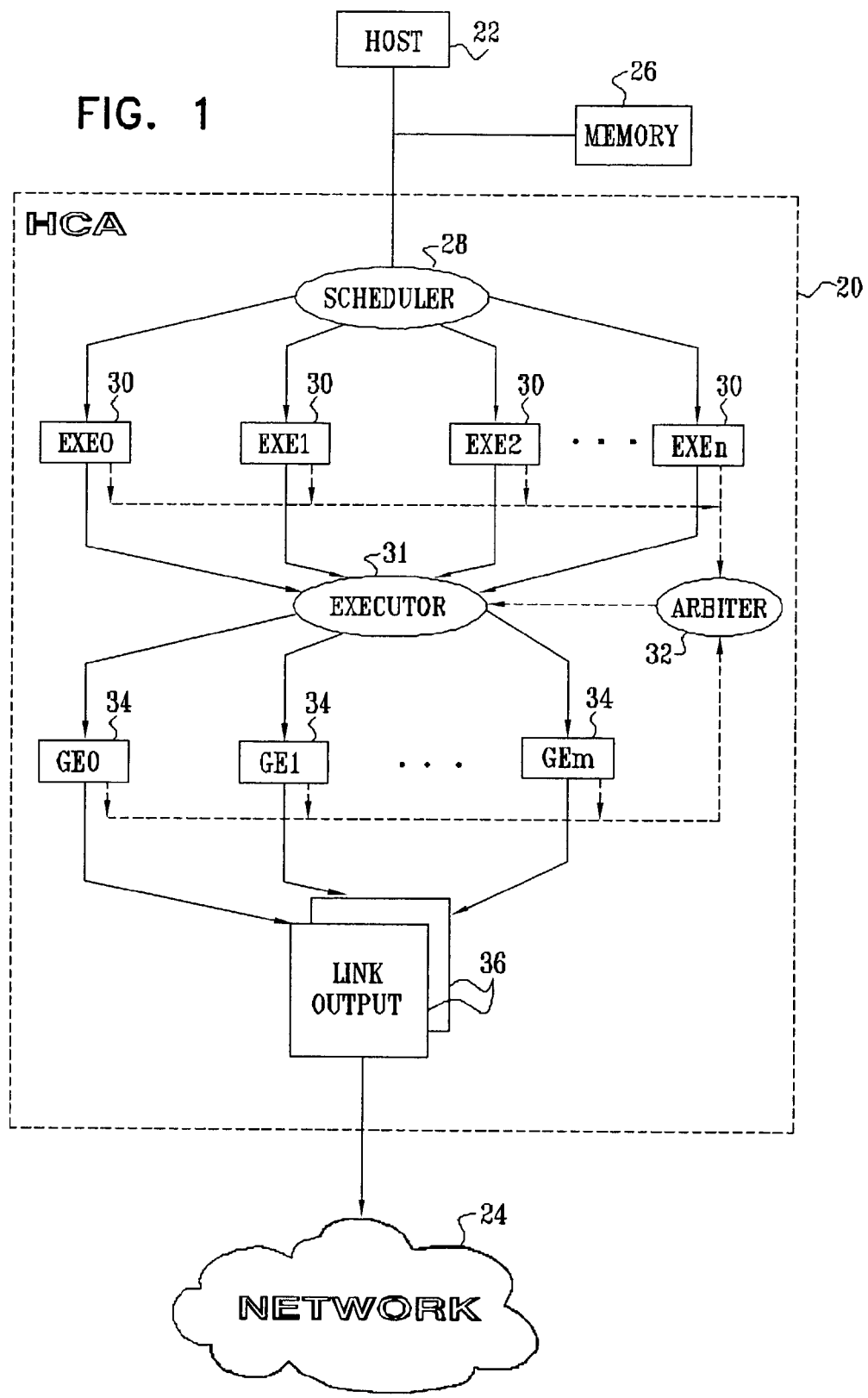
FIG. 1 is a block diagram that schematically illustrates a host channel adapter that includes an arbiter, in accordance with a preferred embodiment of the present invention.

FIG. 1 is a block diagram that schematically illustrates a network adapter 20, which is used to couple a host processor 22 to a network 24, in accordance with a preferred embodiment of the present invention. In this exemplary embodiment, adapter 20 is a host channel adapter (HCA), and network 24 is an InfiniBand™ (IB) switch fabric. It will be understood, however, that the features of adapter 20 described hereinbelow may equally be applied to adapters and networks of other types. Furthermore, the principles of round-robin arbitration embodied in adapter 20 may similarly be used in other communication and data processing applications and are in no way limited to the particular application described here.

The IB architecture is described in detail in the *InfiniBand Architecture Specification*, Release 1.0 (October, 2000), which is incorporated herein by reference. This document is available from the InfiniBand Trade Association at www.infinibandta.org. Briefly speaking, client processes running on host 22 communicate with the transport layer of the IB fabric by manipulating a transport service instance, known as a "queue pair" (QP), made up of a send work queue and a receive work queue. The IB specification permits the HCA to allocate as many as 16 million ($2^{24}$) QPs, each with a distinct queue pair number (QPN). A given client may open and use multiple QPs simultaneously. To send and receive communications over the network, the client initiates work requests (WRs), by writing descriptors to a system memory 26 and notifying HCA 20 that the descriptors are awaiting service. In response, the HCA places work items, called work queue elements (WQEs), in its appropriate queues. The HCA then executes the work items, so as to exchange packets over network 24 with the corresponding QP of the channel adapter at the other end of the link.

Although IB does not explicitly define quality of service (QoS) levels, it provides mechanisms that can be used to support a range of different classes of service and priority on the network. Each IB packet carries a Service Level (SL) attribute, indicated by a corresponding SL field in the packet header, which permits the packet to be transported at one of 16 service levels. Different service levels can be mapped to different virtual lanes (VLs), which provide a mechanism for creating multiple virtual links within a single physical link. A virtual lane represents a set of transmit and receive buffers in a network port. The port maintains separate flow control over each VL, so that excessive traffic on one VL does not block traffic on another VL. The actual VLs that a port uses are configurable, and can be set based on the SL field in the packet.

As noted above, in order to send out packets from HCA 20 on a given QP over network 24, host 22 posts WRs for the QP by writing descriptors in memory 26. When the packets are to carry data from memory 26 to a remote recipient over the network, the descriptors indicate the source of the data to be sent and its destination. The data source information typically includes a "gather list," pointing to the locations in memory 26 from which the data in the outgoing message are to be taken. After host 22 has prepared one or more descriptors, it "rings a doorbell" of HCA 20, by writing to a corresponding doorbell address occupied by the HCA in the address space on the host bus. The corresponding QP is then queued for service by a scheduler 28. The methods used for ringing and servicing the doorbell and processing the host work requests are described in detail in a patent application entitled, "Handling Multiple Network Transport Service Levels with Hardware and Software Arbitration," filed Jan. 23, 2002, which is assigned to the assignee of the present patent application, and whose disclosure is incorporated herein by reference.

Each QP that scheduler 28 selects for service is passed to one of an array of n execution engines (EXE) 30. In the present example, it will be assumed that there are sixteen such engines, preferably implemented as hardware logic units. The assigned execution engine fetches the WQEs of the selected QP from memory 26 and parses the WQEs in order to prepare gather entries to submit to a gather engine (GE) 34. Each gather entry defines a specific piece of header or payload data for inclusion in a packet to be prepared and sent out by the GE. For messages that are to carry data, some of the gather entries include a pointer to the data in memory 26 that are to be included in the packet payloads. (Other types of packets do not require the GE to gather data from the memory.)

Gather entries generated by execution engines 30 are pushed by an executor 31 to gather engines 34. The executor is controlled by an arbiter 32, based on information that the arbiter receives from the execution engines and gather engines. Arbiter 32 embodies the essential elements of the present invention, and is described in detail hereinbelow. In the present example, it is assumed that HCA 20 comprises an array of four gather engines, although executor 31 and arbiter 32 can be configured to feed larger or smaller numbers of gather engines, or even just a single gather engine. Typically, each execution engine is assigned to one particular gather engine, depending on the QP that the execution engine is servicing. A buffer (not shown) is preferably provided to hold the gather entries awaiting execution, when necessary. For each gather entry, the gather engine typically retrieves the data indicated by the entry from memory 26 by direct memory access (DMA) and loads the data into the packet. Alternatively or additionally, the gather engine may construct the packet using "immediate" data in the entry itself. The gather engine then passes the packet to a channel adapter link output 36, which performs link layer functions and submits the packet to a transmit queue for transmission over network 24.

FIG. 1 shows only blocks of HCA 20 that are associated with servicing WRs submitted by host 22 and bear on the operation of arbiter 32. For the sake of simplicity, elements of HCA 20 that are not useful to an understanding of the present invention are omitted. The blocks and links that must be added will be apparent to those skilled in the art. Further details of the HCA are described in the above-mentioned patent application, as well as in another patent application entitled, "Network Interface Adapter with Shared Data Send Resources," filed Dec. 4, 2001, which is likewise assigned to the assignee of the present patent application and whose disclosure is incorporated herein by reference. The various blocks that make up HCA 20 may be implemented either as hardware circuits or as software processes running on a programmable processor, or as a combination of hardware- and software-implemented elements. Preferably, all the elements of the HCA are implemented in a single integrated circuit chip, but multi-chip implementations are also within the scope of the present invention.

FIG. 2 is a timing diagram that schematically illustrates a round-robin cycle 40 employed by arbiter 32 in distributing gather entries from execution engines 30 among gather engines 34, in accordance with a preferred embodiment of the present invention. Cycle 40 comprises thirty-two iterations 42, which are labeled iter0 through iter31. Each iteration is broken into eight windows 44, labeled win0 through win7, giving a total of 256 windows in each cycle. Each window 44 contains up to sixteen time slots 46, one slot for each execution engine. Because cycle 40 contains 256 windows, it allows fine granularity (1:256) in assigning weights to the execution engines, as described below. By building the cycle out of iterations 42, with only eight windows in each iteration, however, the on-chip hardware required to support this long cycle is greatly reduced.

Each QP serviced by HCA 20 is assigned a priority and a weight for use by arbiter 32. These parameters are typically set by a user of host 22, based, for example, on the service level (SL) of the QP and the capacity of the network links to be traversed by packets sent on this QP. As noted above, and described in greater detail hereinbelow, in the scheme represented by FIG. 2, the weight may have any value between 1 and 256. In any given cycle, the execution engine servicing the QP receives a quota of "tokens" that is equal to the assigned weight of the QP. Each token corresponds to a certain fixed quantum of use of the gather engine resources, for example, generation of 256 bytes by the gather engine for transmission via link output 36. For each execution engine, at the beginning of each cycle, arbiter 32 allocates a time slot 46 in each of a number of windows 44 in each iteration 42, wherein the number is determined by the quota, or equivalently to the weight, of the QP being serviced by that gather engine.

As noted above, in addition to its weight, each QP also has an assigned priority. Typically, time-sensitive QPs (such as those used for real-time services such as voice streams) receive high priority, while time-insensitive QPs receive low priority. Preferably, arbiter 32 maintains separate window and iteration structures for the execution engines servicing high-priority QPs from those servicing low-priority QPs. The arbiter allocates slots 46 to each execution engine accordingly, in either the high- or low-priority window/iteration structure.

Based on the time slots allocated to each execution engine 30, arbiter 32 runs through windows 44 in each iteration 42 in succession. For each successive time slot 46 that is allocated to a given execution engine, the execution engine has an opportunity to push gather entries corresponding to one packet to its assigned corresponding gather engine. Arbiter 32 will allow the execution engine to exercise this opportunity as long as the assigned gather engine is available and on condition the execution engine has tokens remaining in its quota and has not recently generated a large burst of data. If an execution engine expends more than a single token at one of its time slots (generating a burst of data by submitting one or more gather entries that causes the gather engine to send a packet longer than 256 bytes, for example), the arbiter may block that execution engine from using one or more of its subsequent slots. These considerations and constraints are described in greater detail hereinbelow with reference to FIGS. 4A, 4B and 5. Arbiter 32 skips immediately over any slots 46 or windows 44 that are not occupied. Thus, it will understood that cycle 40 is asynchronous, and that the windows and iterations in the cycle may expand or contract depending on the number of active execution engines and their weights.

Preferably, cycle 40 does not necessarily begin at the same point in time for each execution engine 30 serviced by arbiter 32. Rather, the arbiter 32 tracks the cycle individually for each execution engine being serviced. Most preferably, the cycle for any given execution engine is started when the execution engine receives a new QP to service. The arbiter then assigns a quota and time slots to the execution engine depending on the weight of the QP. Upon completion of the cycle for a given execution engine, the arbiter refreshes the quota of tokens allocated to that execution engine. Since the times at which different execution engines begin servicing new QPs are essentially random, the starting points of cycle 40 for the different execution engines are likewise randomized. As a result, even though the hardware of arbiter 32 is preferably designed to support only eight windows (in order to save on chip "real estate"), the arbiter behaves as though its time slots were distributed over a full complement of 256 windows. Alternatively, in certain cases (for example, when all the execution engines have exhausted their quotas without finishing their cycles), the arbiter may reset the cycles for all the execution engines, either simultaneously or staggered in sequence.

Similarly, it is not necessary that each iteration 42 start with the same window for all execution engines, and the arbiter can track iterations separately for each execution engine, as well. As in the case of cycle counting, the first iteration in a cycle is considered to start when the execution engine receives a new QP to service. The arbiter preferably tracks the iterations for each execution engine in the following manner: available slots 46 in any given iteration 42 are numbered in order, from 0 to 127 (i.e., eight windows per iteration, times sixteen possible slots per window, giving 128 slots). The first time the arbiter grants a given execution engine access to its assigned gather engine, it notes the slot number. When the arbiter reaches subsequent slots that are allocated to this execution engine, as long as the slot number is greater than this first slot number, the execution engine is still considered to be in the initial iteration. When the next slot number is less than or equal to the first slot number, however, a new iteration is considered to have started. This simple scheme is advantageous in terms of reducing the hardware logic needed to implement arbiter 32. Furthermore, the resultant randomization of the starting points of the iterations for the different execution engines is helpful in maintaining a smooth distribution of gather engine allocation. Alternatively, the arbiter may be configured to start or to reset the iterations for all the execution engines so that they begin at the same window.

Figure 3A:
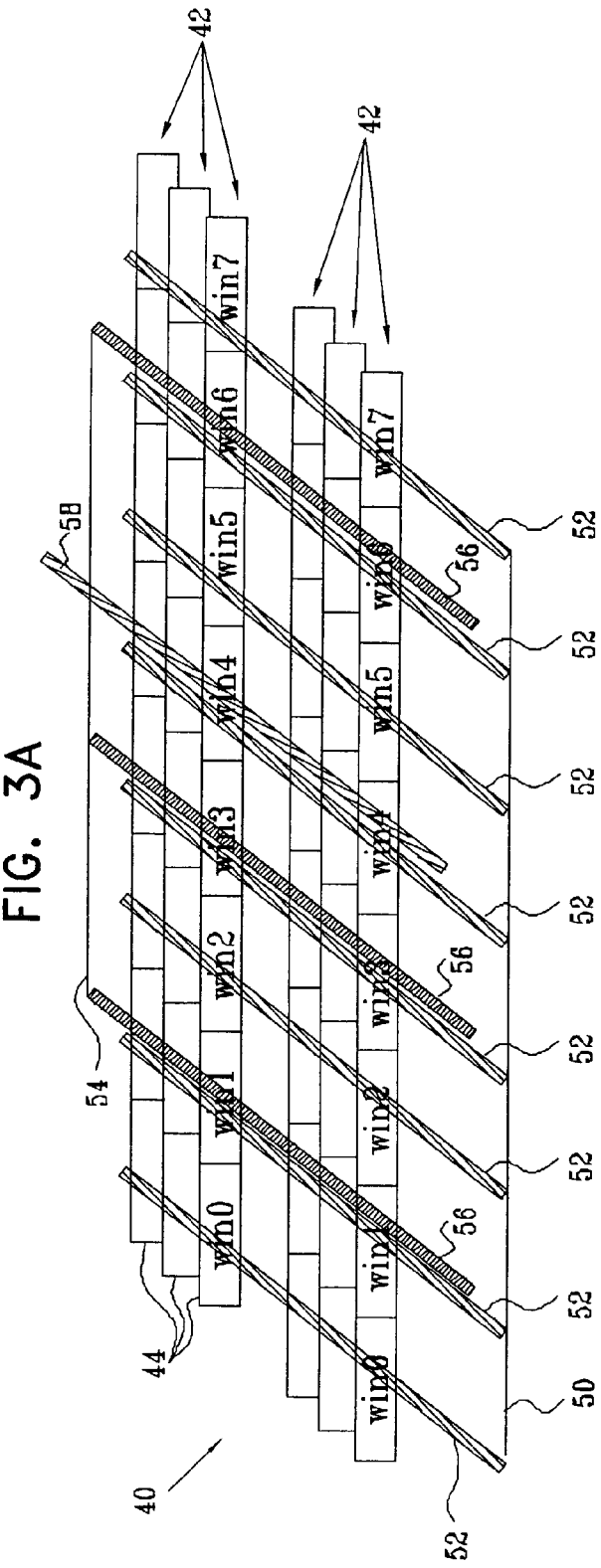
FIG. 3A is a timing diagram that schematically illustrates allocation of time slots among different inputs in a round-robin arbitration cycle, in accordance with a preferred embodiment of the present invention.

FIG. 3A is a timing diagram that schematically illustrates allocation of time slots by arbiter 32 among different execution engines 30, in accordance with a preferred embodiment of the present invention. In this example, a "heavy-weight" execution engine receives a group 50 of time slots 52, including a slot in every window 44 in every iteration 42 of the cycle. A "middle-weight" execution engine receives a group 54 of time slots 56 in three of the eight windows in each iteration. These three windows are spaced evenly, insofar as possible, over the interval. A "light-weight" execution engine receives a slot 58 only in a single window in each interval.

The number of windows in which each execution engine receives a time slot in each iteration is equal to its weight divided by thirty-two (i.e., divided by the number of iterations in a cycle), rounded up to the nearest integer. As a result, the execution engines may be allocated more time slots than their quota will enable them to use. For example, even if the "light-weight" execution engine has a weight/quota of only ten, it will initially be allocated thirty-two time slots in a cycle, one slot in each iteration. After roughly the first ten iterations, however, the quota will be exhausted, assuming the execution engine has an active request to submit at every one of its allocated slots. Arbiter 32 will therefore skip over the remaining slots that are allocated to this execution engine until it reaches the end of the cycle and refreshes the quota. As a result, a small amount of jitter may be introduced in servicing of light-weight QPs by gather engines 34. This problem could be overcome by reducing the number of iterations in each cycle, and increasing the number of windows in each iteration. The present approach is advantageous, however, in that it allows arbiter 32 to effectively generate cycles of 256 windows, and therefore support 256 different weight levels, while actually making slot allocations for only eight windows at a time. As a result, the hardware logic required to implement arbiter 32 is substantially reduced, typically requiring only a few hundred flip-flops (or memory cells) to perform the sixteen-way arbitration shown in FIG. 1.

Figure 3B:
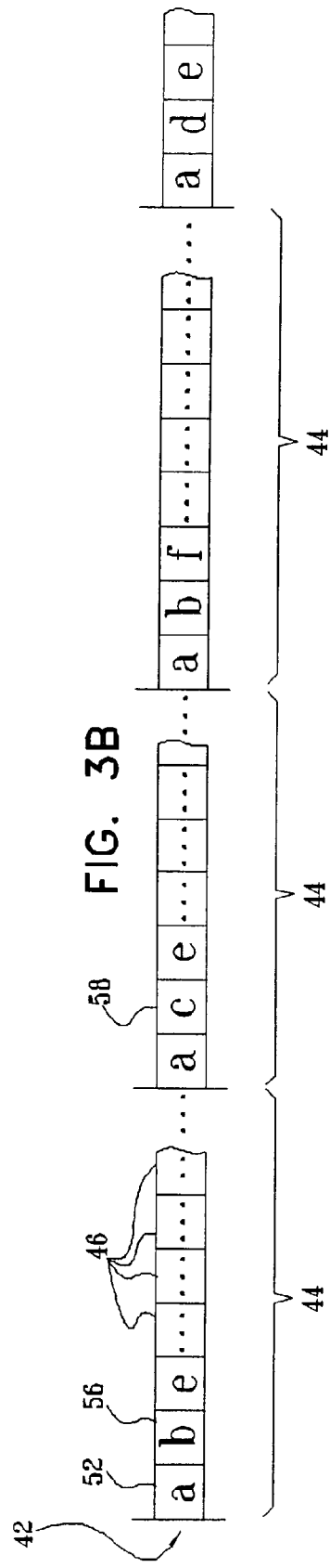
FIG. 3B is a timing diagram that schematically shows details of the allocation of time slots shown in FIG. 3A.

FIG. 3B is a timing diagram showing details of an iteration 42, in order to illustrate how arbiter 32 allocates slots 46 among the different execution engines. Some of the slots in the figures are marked with lower-case letters, which are meant to correspond to different execution engines, or their corresponding QPs, to which time slots are allocated. It is assumed that QPa is a heavy-weight QP, QPb is middle-weight, and QPc is light-weight.

Arbiter 32 begins by allocating slot 52 to the execution engine servicing QPa in every window 44 in iteration 42. Next, the execution engine servicing QPb is allocated slot 56 in alternating windows 44, so that the windows in which this execution engine receives service are spread over iteration 42, rather than bunched together. To allocate slot 58 to the execution engine servicing QPc, arbiter 32 seeks the least-occupied window in the iteration. Since the second slot in the second window of the iteration is not yet allocated, arbiter 32 assigns this slot to QPc. Similarly, the next execution engine, servicing QPd, is assigned the second slot in the fourth window. This procedure continues until all the execution engines that currently have gather entries awaiting service are assigned their respective slots, in such a way that an approximately equal number of slots are occupied in all the windows. As a result, the times at which any one of the execution engines receives service by its assigned gather engine are spaced roughly evenly over the entire iteration.

Figure 4A:
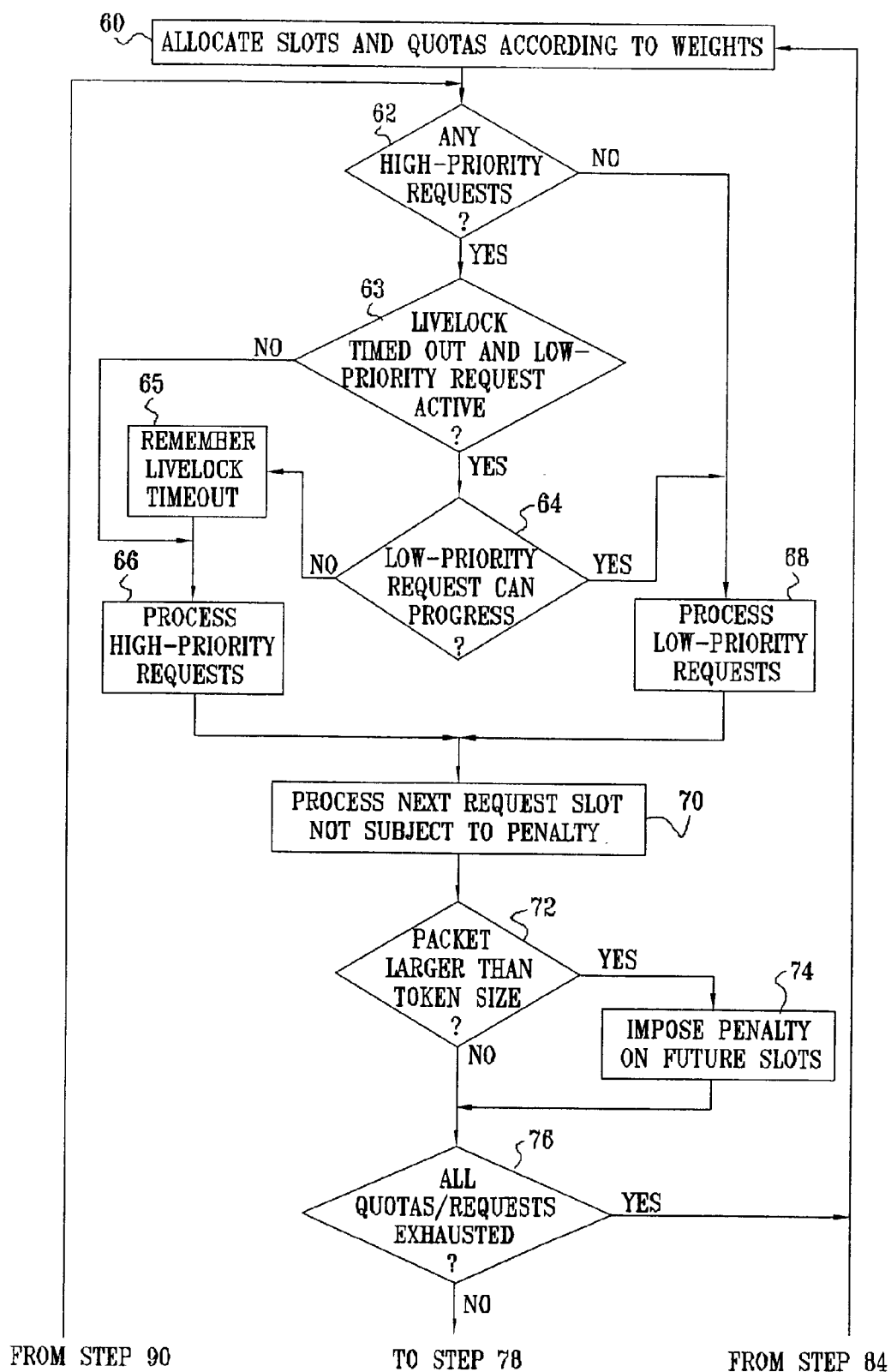
FIGS. 4A and 4B are flow charts that schematically illustrate a method for arbitrating among multiple inputs, in accordance with a preferred embodiment of the present invention.
Figure 4B:
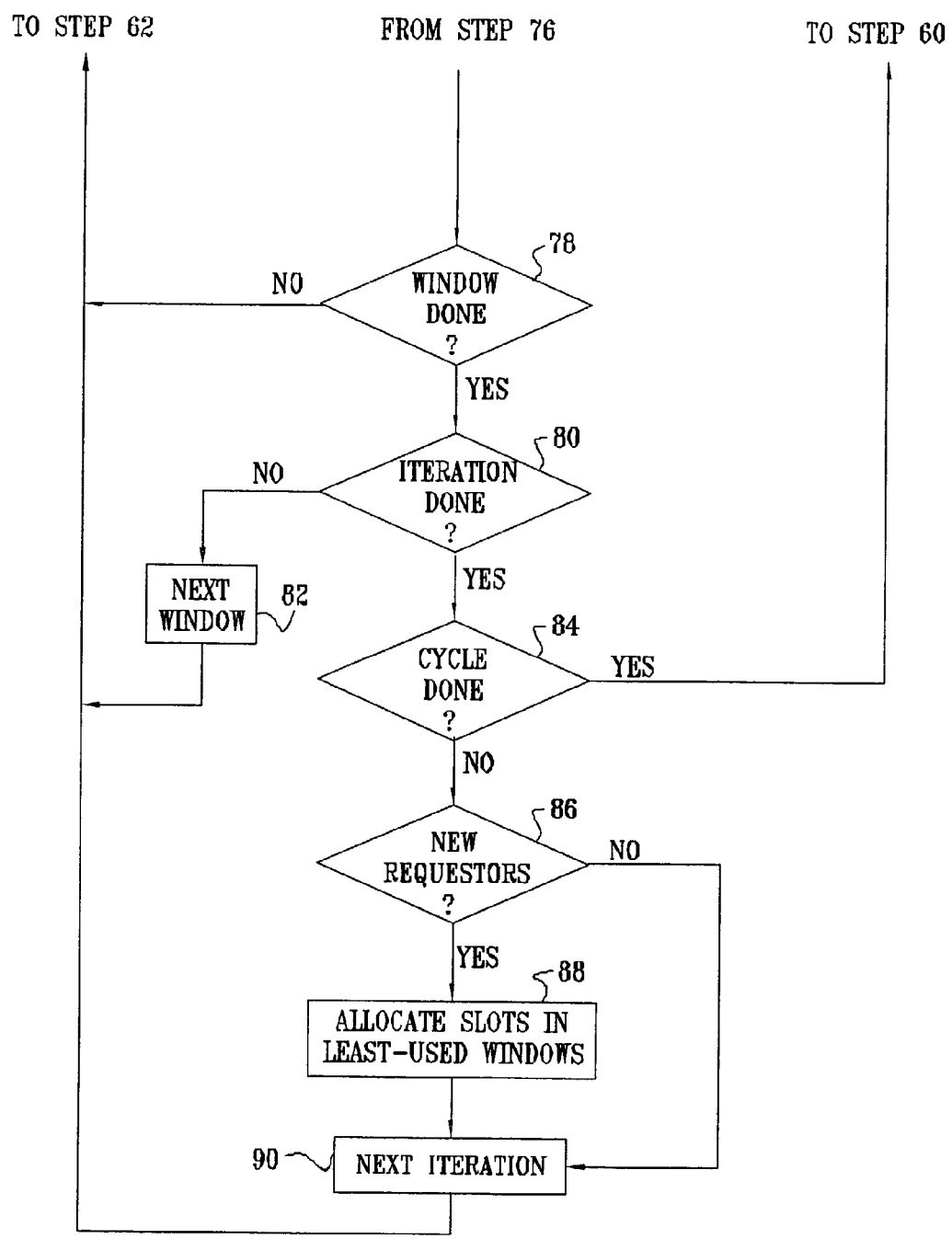

FIGS. 4A and 4B are flow charts that schematically illustrate a method used by arbiter 32 to assign execution engines 30 to pass gather entries to gather engines 34, in accordance with a preferred embodiment of the present invention. The method begins whenever one of the execution engines receives a new QP to service, with its preassigned priority level and weight. Arbiter 32 allocates time slots and a quota of tokens to the execution engine, as described above, at a slot allocation step 60. At this point, cycle 40 is initiated for this execution engine, and arbiter 32 begins granting access to the gather engines, slot by slot.

At each time slot, arbiter 32 ascertains whether there are any high-priority execution engines waiting for service, at a priority checking step 62. As a rule, high-priority gather entries always receive service in preference to low-priority entries. In order to prevent total starvation of the low-priority QPs, however, arbiter 32 preferably maintains a livelock counter, measuring the time elapsed or number of bytes sent (or tokens expended) since the last low-priority packet was passed to a gather engine. The arbiter checks the value of the livelock counter, at a livelock checking step 63, and also checks whether there are any low-priority requests awaiting service. If there is a high-priority execution engine request awaiting service, and the counter has not yet reached its limit, the arbiter will choose the next high-priority request for service, at a high-priority service step 66.

Only if there are no more high-priority requests (step 62), or if the livelock counter has reached its limit (step 63), will the arbiter consider the next low-priority request. In the case of livelock expiration, with low-priority requests awaiting service, the arbiter verifies that there is a low-priority request that can be serviced, at a progress checking step 64. (It is possible, for example, that all the pending low-priority requests are blocked by quota exhaustion or penalty, as described below.) As long as the conditions of step 62 or of steps 63 and 64 are met, the arbiter allows the next low-priority execution engine to push a packet to its assigned gather engine, at a low-priority service step 68. Typically, if the livelock counter has reached its limit, and there are still high-priority requests waiting for service, a single low-priority packet will be sent through for processing. The counter is then reset, and processing of the high-priority requests continues. If there is no low-priority request that can proceed at step 64, however, the arbiter does not reset the counter, but rather notes that it has expired, at a livelock remembrance step 65. As a result, the arbiter will still consider the counter to be expired the next time the process of FIG. 4A reaches step 63.

In each time slot, arbiter 32 attempts to grant service to the execution engine to which the slot has been allocated (in either the high- or low-priority cycle, as appropriate), at a request processing step 70. The execution engine will receive service in its allocated slot as long as it meets the following conditions:

Its quota for this cycle has not been exhausted.
Its assigned gather engine is available.
It is not subject to a "penalty" for having sent a burst of data longer than a single token's worth in a previous time slot.

Figure 5:
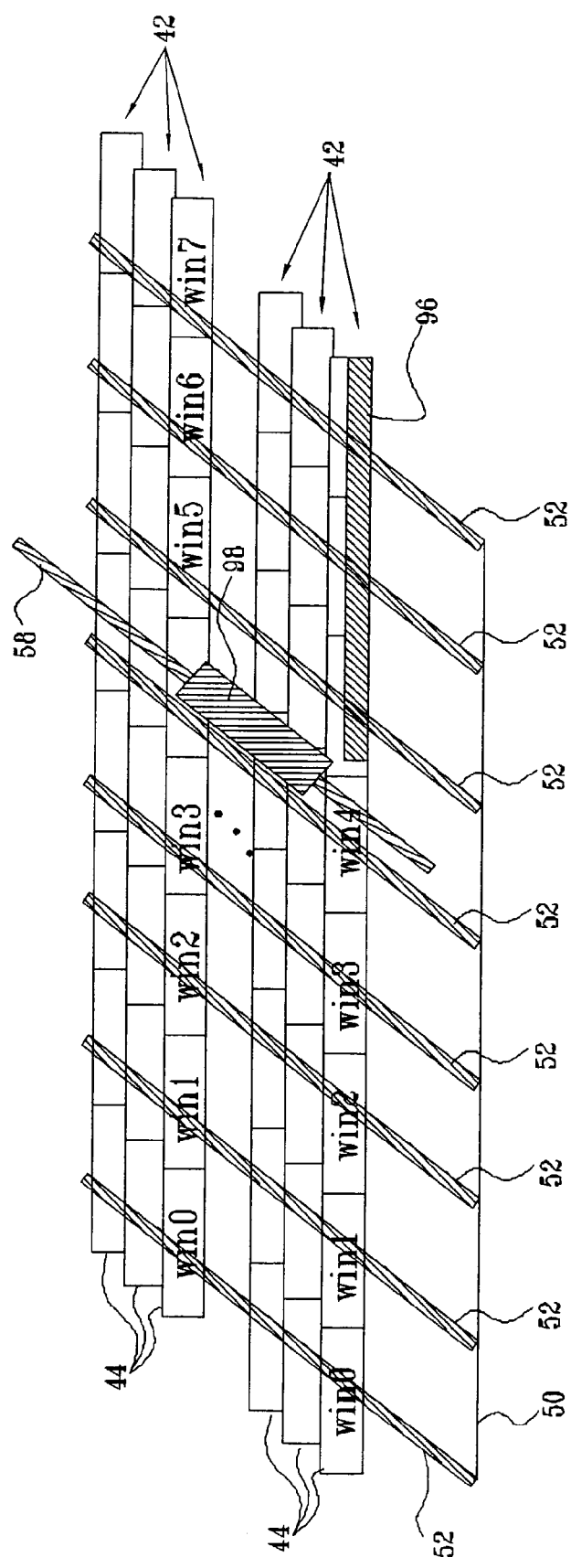
FIG. 5 is a timing diagram that schematically illustrates handling of a burst of data submitted by one of the inputs in a round-robin arbitration cycle, in accordance with a preferred embodiment of the present invention.

FIG. 5 is a timing diagram that schematically illustrates how such a "penalty" is imposed to compensate for data bursts, in accordance with a preferred embodiment of the present invention. This figure illustrates a situation in which an execution engine receives access to its assigned gather engine in its slot in window "win4," and submits gather entries that consumes four tokens' worth of HCA resources. In other words, in the present example, the gather entries cause the gather engine to generate a packet of about 1 kB.

As a result of this burst of data, the "offending" execution engine is barred from access to the gather engine in the next three windows in which it has an allocated slot. In the case of a "heavy-weight" execution engine, with slots 52 allocated in multiple windows, arbiter 32 bars the engine from access during the next three windows in the same iteration 42, as shown by a window bar region 96 in FIG. 5. For a "light-weight" execution engine, with only one slot 58 per iteration, the arbiter bars the engine from access during the next three iterations, as shown by an iteration bar region 98. Combinations of window bars and iteration bars are also possible. In either case, when the execution engine consumes N>1 tokens at a given turn, the arbiter preferably counts down the next N−1 windows in which slots are allocated to that execution engine before it again allows the execution engine to access the gather engine.

In an alternative implementation, arbiter 32 determines and counts down the penalty time in terms of iterations 42, rather than counting windows 44. Preferably, the iterations are counted individually for each execution engine, as described above. When the determined number of iterations has passed, the penalty time is over. For "light-weight" engines, which are allocated only one slot per iteration, the result of this method will be the same as if the arbiter counted windows. For "heavy-weight" engines, the penalty imposed may deviate from the actual excess number of tokens that was spent by up to four slots, plus or minus. This transient deviation from fairness is insignificant in the long run, and keeping account of penalties in this way simplifies the hardware logic needed to implement arbiter 32.

Returning now to step 70 in FIG. 4A, as long as the execution engine to which the current slot is allocated is not subject to penalty and meets the other requirements described above, arbiter 32 grants it access to pass one or more gather entries to its assigned gather engine, for generation of an outgoing packet. The execution engine notifies the arbiter of the number of tokens that it is going to spend on this packet, at a token checking step 72. As noted above, each token corresponds roughly to 256 bytes of data to be carried by the packet generated in response to the gather entries. The arbiter counts off the number of tokens used against the quota of tokens allocated to the execution engine. If the packet requires more than a single token, the arbiter imposes a penalty on the execution engine, at a penalty step 74. The penalty will block the execution engine from using future slots allocated to it in one or more iterations 42, as described above.

The arbiter then proceeds to service the next slot 46 in its sequence. Any unallocated slots are skipped, as are slots that are allocated to execution engines that are inactive or subject to penalty, have exhausted their quotas, or whose gather engines are busy. The arbiter may at times determine, in fact, that there is currently no execution engine that both has a request outstanding and is eligible to submit a request, at a request exhaustion step 76. (There may be some execution engines that have requests outstanding but no quota remaining, while others have a quota but no requests, for example.) In such cases, in order to prevent deadlock and waste of resources of HCA 20, the arbiter preferably resets arbitration cycles 40 of all the execution engines, or at least of the execution engines that have requests pending. It then allocates new slots and quotas to the execution engines at step 60, as described above. Preferably, any outstanding penalties are also reduced or wiped out, most preferably by releasing one penalty quantum at every clock cycle until at least one of the execution engines has no more penalty left and can proceed. The arbitration process then resumes.

As long as there are requests waiting to be serviced, the arbiter checks whether it has finished all the occupied slots in the current window, at a window completion step 78, and if so, whether it has completed the entire iteration, at an iteration completion step 80. When the arbiter counts iterations individually for each execution engine, as noted above, step 80 refers to the iteration count of the particular execution engine that is currently up for service. If the arbiter has completed the window, but not the iteration, it moves on to the next window, at a window incrementing step 82. If an iteration has passed, the arbiter checks its iteration counter (typically the individual counter for this execution engine), to determine whether it has completed an entire cycle, at a cycle checking step 84. If so, the arbiter allocates a new quota to the execution engine, at step 60, and proceeds to service its request.

At any point in the operation of arbiter 32, one of execution engines 30 may notify the arbiter that it has received a new QP for service, and request an allocation of time slots, at a new request submission step 86. The execution engine notifies the arbiter of the priority and weight of the QP. In response, the arbiter determines which is the least-occupied window 44 in its next iteration 42, and allocates the appropriate number of slots 46 to this execution engine beginning with this window, at a new slot allocation step 88. The method of allocation is illustrated above in FIGS. 3A and 3B. The new execution engine also receives its quota for the coming cycle. The arbiter then continues to the next iteration, at an iterating step 90.

Although in the preferred embodiments described above, arbiter 32 is used for a specific function in the operation of HCA 20, the principles of the present invention may similarly be applied in other arbitration contexts. For example, an arbiter based on the principles described above may be used in a network switch, to resolve conflicts among switch input ports seeking to transfer packets to the switch output ports. As another example, the arbiter may be used to control access by multiple clients to a common bus or communication link. Other applications will be apparent to those skilled in the art. Arbiters in accordance with embodiments of the present invention have the advantages of maintaining fairness, with low output bandwidth jitter and robustness in the face of input bursts, without requiring extensive high-speed logic. Such arbiters are therefore particularly well-suited to hardware implementation, especially as embedded devices, but they may also be implemented advantageously in software. Because the low jitter of the arbiter contributes to reducing the occurrence of bursts in the device output, it also reduced the likelihood of downstream data pile-up and congestion. As a result, when such arbiters are used in network devices, for example, the buffer memory requirements of other devices downstream in the network may also be diminished.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for allocating a processing resource among multiple inputs, comprising:
   defining a sequence of multiplexing iterations, each such iteration comprising a first plurality of windows, each such window containing a second plurality of time slots;
   assigning a respective weight to each of the inputs;
   allotting to each of the inputs one of the time slots in each of a respective number of the windows in each of the iterations, the respective number being determined by the respective weight; and
   providing each of the inputs with access to the processing resource during the time slots allotted thereto.

2. A method according to claim 1, wherein defining the sequence of multiplexing intervals comprises defining a round-robin cycle comprising a third plurality of the multiplexing intervals, and wherein providing each of the inputs with access comprises allocating to each of the inputs a quota of use of the resource responsive to the respective weight, and permitting the access by a given one of the inputs only if that one of the inputs has not reached its quota during the cycle.

3. A method according to claim 2, wherein allocating the quota comprises reallocating the quota upon completion of the cycle, so as to provide each of the inputs with the access duxing a subsequent cycle responsive to the reallocated quota.

4. A method according to claim 2, wherein defining the cycle comprises defining respective starting points of the cycle for the multiple inputs, such that the starting points for at least two of the inputs are not mutually simultaneous.

5. A method according to claim 2, wherein the resource is operative to convey data submitted by the inputs, and wherein allocating the quota comprises allocating a quantity of the data to be conveyed during the cycle using the resource.

6. A method according to claim 1, and comprising assigning each of the inputs to one of at least a high and a low priority level, wherein defining the sequence of multiplexing intervals comprises defining a first sequence of the multiplexing intervals for the inputs assigned to the high priority level, and a second sequence of the multiplexing intervals for the inputs assigned to the low priority level.

7. A method according to claim 6, wherein providing the access comprises preventing the inputs at the low priority level from accessing the resource when at least one of the inputs at the high priority level has requested the access during one of the time slots.

8. A method according to claim 7, wherein providing the access further comprises computing a measure of use of the resource by the inputs at the high priority level, and permitting at least one of the inputs at the low priority level to access the resource when the measure has passed a predetermined limit without the access having been granted to any of the inputs at the low priority level.

9. A method according to claim 1, wherein each of the time slots corresponds to a predetermined quantum of use of the resource, and wherein providing the access comprises determining when a given one of the inputs has exceeded the quantum in using the resource at one of its allotted time slots, and blocking the given one of the inputs from accessing the resource in a subsequent one of its allotted time slots, responsive to its having exceeded the quantum.

10. A method according to claim 9, wherein the resource is operative to convey data submitted by the inputs, and wherein the predetermined quantum corresponds to a quantity of the data conveyed by the resource.

11. A method according to claim 9, wherein determining when the given one of the inputs has exceeded the quantum comprises determining an amount by which the given one of the inputs has exceeded the quantum, and wherein blocking the given one of the inputs comprises preventing the given one of the inputs from accessing the resource over multiple subsequent allotted time slots, responsive to the amount by which the quantum was exceeded.

12. A method according to claim 1, wherein allotting the time slots comprises interspersing the time slots allotted to each of the inputs, so that the slots allotted to each of the inputs are spread approximately evenly over time during the sequence of the iterations.

13. A method according to claim 12, wherein interspersing the time slots comprises, prior to allotting the time slots to one of the inputs, identifying one or more of the windows in which fewest of the time slots have already been allotted to others of the inputs, and allotting the time slots to the one of the inputs in the identified windows.

14. A method according to claim 1, wherein the processing resource comprises multiple resource instances, wherein providing the access comprises receiving a request from one of the inputs to access a specified one of the resource instances in a given one of the allotted time slots, and granting the request only if the specified one of the resource instances is available during the given one of the allotted time slots.

15. A method according to claim 1, wherein the multiple inputs comprises multiple execution engines, which are operative to prepare instructions regarding data to be transmitted over a network, and wherein providing the access comprises selecting one of the execution engines to submit the instructions, and transmitting a packet containing the data responsive to the instructions.

16. A method according to claim 15, wherein providing the access comprises assigning each of the execution engines to a respective gather engine, which is operative to generate the packet responsive to the instructions, and wherein transmitting the packet comprises passing the instructions from the selected one of the execution engines to the respective gather engine, for generation of the packet thereby.

17. Apparatus for allocating a processing resource, comprising a round-robin arbiter which is configured to receive multiple inputs, each input having a respective weight assigned thereto, the arbiter being configured to define a sequence of multiplexing iterations, each such iteration comprising a first plurality of windows, each such window containing a second plurality of time slots, and to allot to each of the inputs one of the time slots in each of a respective number of the windows in each of the iterations, the respective number being determined by the respective weight, the arbiter further being configured to provide each of the inputs with access to the processing resource during the time slots allotted thereto.

18. Apparatus according to claim 17, wherein the arbiter is configured to define a round-robin cycle comprising a third plurality of the multiplexing intervals, and to allocate to each of the inputs a quota of use of the resource responsive to the respective weight, and to permit the access by a given one of the inputs only if that one of the inputs has not reached its quota during the cycle.

19. Apparatus according to claim 18, wherein the arbiter is configured to reallocate the quota upon completion of the cycle, so as to provide each of the inputs with the access during a subsequent cycle responsive to the reallocated quota.

20. Apparatus according to claim 18, wherein the arbiter is configured to define respective starting points of the cycle for the multiple inputs, such that the starting points for at least two of the inputs are not mutually simultaneous.

21. Apparatus according to claim 18, wherein the resource is operative to convey data submitted by the inputs, and wherein the quota corresponds to a quantity of the data to be conveyed during the cycle using the resource.

22. Apparatus according to claim 17, wherein each of the inputs is assigned to one of at least a high and a low priority level, and wherein the arbiter is configured to define a first sequence of the multiplexing intervals for the inputs assigned to the high priority level, and a second sequence of the multiplexing intervals for the inputs assigned to the low priority level.

23. Apparatus according to claim 22, wherein the arbiter is configured to prevent the inputs at the low priority level from accessing the resource when at least one of the inputs at the high priority level has requested the access during one of the time slots.

24. Apparatus according to claim 23, wherein the arbiter is configured to compute a measure of use of the resource by the inputs at the high priority level, and to permit at least one of the inputs at the low priority level to access the resource when the measure has passed a predetermined limit without the access having been granted to any of the inputs at the low priority level.

25. Apparatus according to claim 17, wherein each of the time slots corresponds to a predetermined quantum of use of the resource, and wherein the arbiter is configured to determine when a given one of the inputs has exceeded the quantum in using the resource at one of its allotted time slots, and to block the given one of the inputs from accessing the resource in a subsequent one of its allotted time slots, responsive to its having exceeded the quantum.

26. Apparatus according to claim 25, wherein the resource is operative to convey data submitted by the inputs, and wherein the predetermined quantum corresponds to a quantity of the data conveyed by the resource.

27. Apparatus according to claim 25, wherein the arbiter is configured to determine an amount by which the given one of the inputs has exceeded the quantum, and to prevent the given one of the inputs from accessing the resource over multiple subsequent allotted time slots, responsive to the amount by which the quantum was exceeded.

28. Apparatus according to claim 17, wherein the arbiter is configured to intersperse the time slots that it allots to each of the inputs, so that the slots allotted to each of the inputs are spread approximately evenly over time during the sequence of the iterations.

29. Apparatus according to claim 28, wherein to intersperse the time slots comprises, the arbiter is configured to identify one or more of the windows in which fewest of the time slots have already been allotted to others of the inputs, and to allot the time slots to the one of the inputs in the identified windows.

30. Apparatus according to claim 17, wherein the processing resource comprises multiple resource instances, and wherein the arbiter is coupled to receive a request from one of the inputs to access a specified one of the resource instances in a given one of the allotted time slots, and to grant the request only if the specified one of the resource instances is available during the given one of the allotted time slots.

31. Apparatus according to claim 17, wherein the multiple inputs comprise multiple execution engines, which are operative to prepare instructions regarding data to be transmitted over a network, and wherein the arbiter is coupled to provide each of the execution engines with access to submit the instructions, so as to cause a packet containing the data to be transmitted responsive to the instructions.

32. Apparatus according to claim 31, wherein each of the execution engines is assigned to a respective gather engine, which is operative to generate the packet responsive to the instructions, and wherein the arbiter is coupled to allow the instructions to be passed from the selected one of the execution engines to the respective gather engine, for generation of the packet thereby.

33. A network interface device, comprising:
an array of execution engines, which are coupled to receive work requests from a host processor to convey messages over a network, and which are configured, responsive to the work requests, to prepare instructions regarding data packets to be transmitted over the network in order to convey the messages, each of the execution engines having a respective weight assigned thereto;
one or more gather engines, which are configured to generate the data packets for transmission, responsive to the instructions; and
an arbiter, which is configured to define a sequence of multiplexing iterations, each such iteration comprising a first plurality of windows, each such window containing a second plurality of time slots, and to allot to each of the execution engines one of the time slots in each of a respective number of the windows in each of the iterations, the respective number being determined by the respective weight assigned to each of the execution engines, the arbiter being coupled between the array of execution engines and the one or more gather engines so as to allow each of the execution engines to pass its instructions to one of the gather engines during the time slots allotted thereto.

34. A device according to claim 33, wherein the arbiter is configured to define a round-robin cycle comprising a third plurality of the multiplexing intervals, and to allocate to each of the execution engines a quota of use of the resource responsive to the respective weight, and to permit the access by a given one of the inputs only if that one of the inputs has not reached its quota during the cycle.

35. A device according to claim 33, wherein each of the execution engines is assigned to one of at least a high and a low priority level, and wherein the arbiter is configured to define a first sequence of the multiplexing intervals for the execution engines assigned to the high priority level, and a second sequence of the multiplexing intervals for the execution engines assigned to the low priority level.

36. A device according to claim 33, wherein the arbiter is configured to intersperse the time slots that it allots to each of the execution engines, so that the slots allotted to each of the execution engines are spread approximately evenly over time during the sequence of the iterations.

37. A device according to claim 33, wherein each of the execution engines is coupled to receive the work requests belonging to a respective queue pair that is assigned thereto, and wherein the respective weight is assigned to each of the execution engines responsive to a characteristic of the respective queue pair.

* * * * *